No. 700,150. Patented May 13, 1902.
H. MÜLLER.
POWER INDICATOR.
(Application filed Jan. 16, 1902.)
(No Model.)

WITNESSES:
Margaret Potter
Hetty Suhrbier

INVENTOR
Hermann Müller
by Grace Wahle
his ATTORNEYS.

UNITED STATES PATENT OFFICE.

HERMANN MÜLLER, OF LEIPSIC, GERMANY.

POWER-INDICATOR.

SPECIFICATION forming part of Letters Patent No. 700,150, dated May 13, 1902.

Application filed January 16, 1902. Serial No. 90,077. (No model.)

*To all whom it may concern:*

Be it known that I, HERMANN MÜLLER, a citizen of the Empire of Germany, residing in Leipsic, in the Kingdom of Saxony and Empire of Germany, have invented certain new and useful Improvements in Power-Indicators, of which the following is a specification.

This invention relates to an improved power-indicator in which for the purpose of equalizing the location of the springs relatively to their centers of gravity two or more spiral springs are employed and in which the varying strength of the power transmitted is indicated in connection with intermediate mechanical means and a previously-determined curve on a suitable counting device, as will be fully described hereinafter and finally pointed out in the claims.

Figure 1:
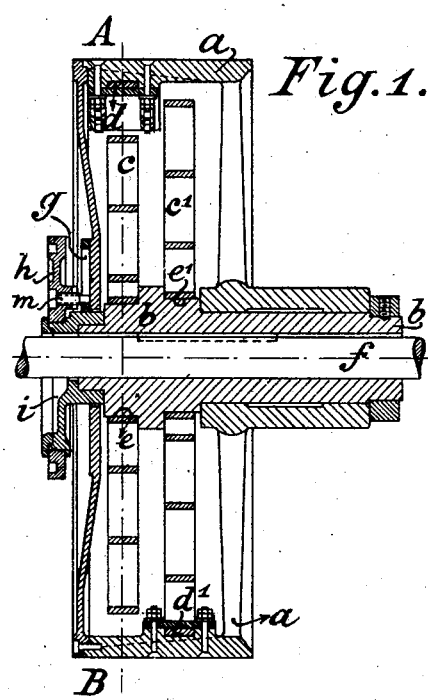
Figure 2:
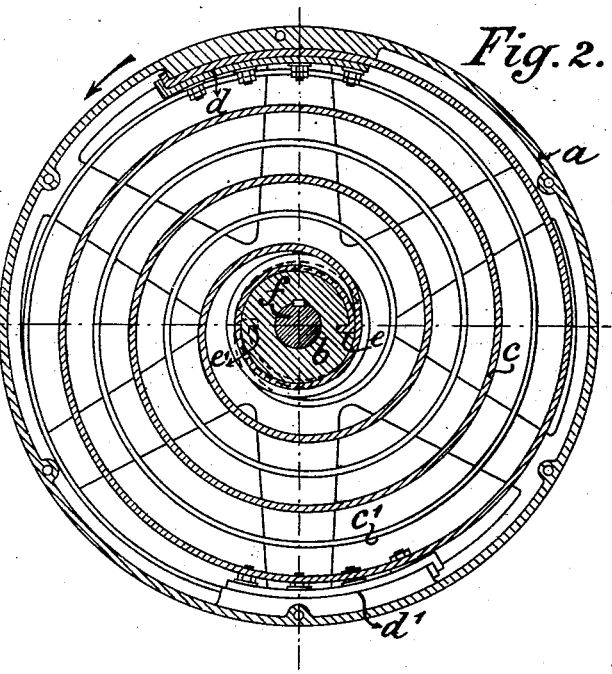
Figure 3:
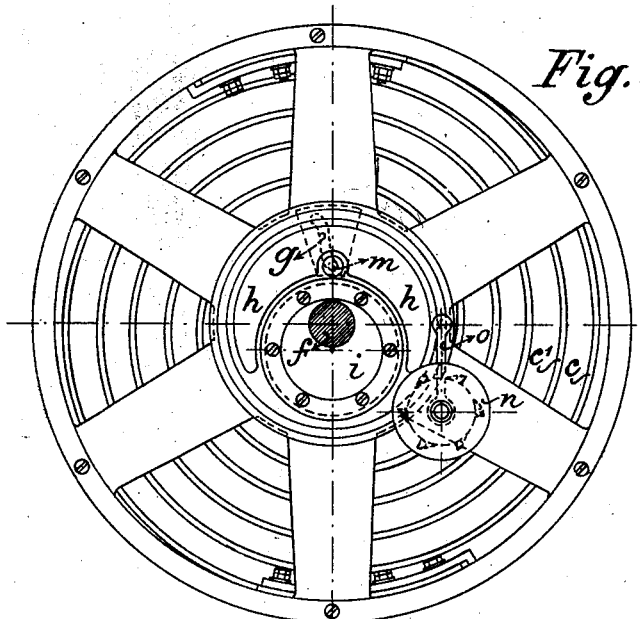
Figure 4:
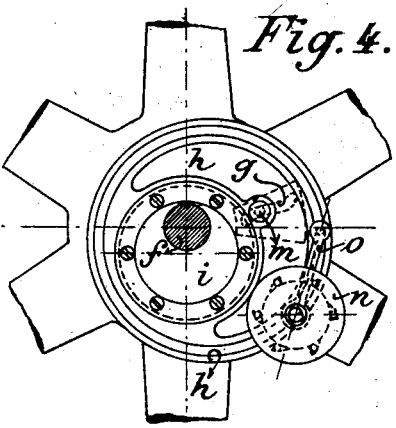

In the accompanying drawings, Figure 1 represents a vertical longitudinal section of my improved power-indicator. Fig. 2 is a vertical transverse section on line A B, Fig. 1; and Figs. 3 and 4 show the connection of my improved power-indicator with a pair of actuating-eccentrics.

Similar letters of reference indicate corresponding parts.

My improved power-indicator is composed of a cylindrical pulley $a$, which forms at the same time a casing and which is so arranged on a hub $b$ as to turn around the same. The pulley $a$ is connected by means of two or more spiral springs $c$ $c'$ with the hub $b$, said springs forming the elastic member between the pulley $a$ and the hub $b$. The two springs $c$ $c'$ are equal in width, strength, length, and weight and are attached to the inner surface of the rim of the pulley $a$ at $d$ $d'$ in such a manner as to be transposed toward each other at an angle of one hundred and eighty degrees. As the springs $c$ $c'$ are of equal length, the fastenings of the inner ends of the springs to the hub at $e$ $e'$ are likewise at diametrically opposite points to each other. By this disposition of the springs $c$ $c'$ their position relatively to their centers of gravity is always equalized toward the axis of rotation, which is of considerable value in the accurate functioning of the power-indicator, especially at high speeds of rotation.

The spring-carrying hub $b$ is either attached to the shaft of the transmitting mechanism or to the driving-shaft of the machine whose power is to be indicated. The rim of the pulley $a$ is supported by radial arms of a nave mounted on the hub $b$, and the front of the pulley is provided with a cover that carries a curve $g$, by which the axially-shifting motion of the pulley $a$ relatively to the hub $b$ is transmitted by a pin $m$ on an eccentric cam $h$. The curve $g$ has a definite form, which corresponds with the arrangement of the intermediate mechanical links by which the axially-shifting motion is transmitted to a counter $n$, more or less as in the similar device set forth in Letters Patent granted to Julius Wilhelm Von Pittler, No. 592,442, dated October 26, 1897. The form of the curve $g$ is determined, so that the shifting angle of the counter end is in proportion with the shifting angle formed between the pulley $a$ and hub $b$.

The operation of the improved power-indicator will be readily understood from the following description: The driving-belt turns the pulley $a$ in the direction of the arrow shown in Fig. 2, by which the pulley is turned relatively to the hub $b$. The greater the power used the greater will be the relative angular motion between the pulley $a$ and the hub $b$—i. e., the transmitting-shaft $f$—for the reason that the spiral springs $c$ $c'$ are set thereby to greater tension. With a uniform transmission of power the shifting angle remains the same. When the power transmitted is decreased, the shifting angle between the parts becomes smaller. As the curve $g$ on the pulley $a$ serves to guide the pin $m$ on the eccentric $h$, the shifting motion of the pulley is transmitted to the eccentric. As the eccentric $h$ is placed on the grooved rim of a second eccentric $i$, which is connected with the hub $b$, the eccentric $h$ is enabled to make a greater or smaller stroke, according to the shifting angle of the pulley, which stroke is transmitted by means of the lever $o$ onto the counter $n$. Fig. 3 shows the position of the eccentrics $h$ and $i$ relatively to each other when no power is transmitted, Fig. 4 their position when power is transmitted.

Having thus described my invention, I claim as new and desire to secure by Letters Patent—

1. A power-indicator, comprising a shaft to be driven, a hub on the same, a pulley and a plurality of spiral springs which are connected at their outer ends with the rim of the pulley, and at their inner ends with the hub in such a manner that the locations of the centers of gravity of the springs are equalized relatively to the axis of rotation, substantially as set forth.

2. A power-indicator, comprising a driven shaft, a hub on said shaft, a pulley and a plurality of spiral springs, the outer ends of which are connected with the pulley at diametrically opposite points, and the inner ends thereof are connected at diametrically opposite points with the hub at an angle of ninety degrees relatively to the outer ends so that the locations of the centers of gravity of the springs are equalized relatively to the axis of rotation, substantially as set forth.

In testimony that I claim the foregoing as my invention I have signed my name in presence of two subscribing witnesses.

HERMANN MÜLLER.

Witnesses:
   FRIEDR. KORNER,
   RUDOLPH FRICKE.